(12) United States Patent
Hashimoto

(10) Patent No.: US 11,025,516 B2
(45) Date of Patent: Jun. 1, 2021

(54) COMMUNICATION APPARATUS PROVIDED WITH LAN INTERFACES AND PREVENTING CONNECTION TO WRONG NETWORK, CONTROL METHOD, AND STORAGE MEDIUM

(71) Applicant: CANON KABUSHIKI KAISHA, Tokyo (JP)

(72) Inventor: Minoru Hashimoto, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/234,230

(22) Filed: Dec. 27, 2018

(65) Prior Publication Data

US 2019/0215255 A1  Jul. 11, 2019

(30) Foreign Application Priority Data

Jan. 5, 2018  (JP) .............................. JP2018-000549

(51) Int. Cl.
| | |
|---|---|
| *G06F 15/16* | (2006.01) |
| *H04L 12/26* | (2006.01) |
| *H04L 29/12* | (2006.01) |
| *H04L 12/46* | (2006.01) |
| *H04N 1/32* | (2006.01) |
| *H04N 1/00* | (2006.01) |

(52) U.S. Cl.
CPC ...... *H04L 43/0811* (2013.01); *H04L 12/4604* (2013.01); *H04L 61/2015* (2013.01); *H04L 61/2076* (2013.01); *H04N 1/0048* (2013.01); *H04N 1/00244* (2013.01); *H04N 1/32507* (2013.01); *H04N 1/32614* (2013.01); *H04N 2201/0094* (2013.01)

(58) Field of Classification Search
CPC ............. H04L 43/0811; H04L 61/2015; H04L 61/2076; H04L 12/4604; H04N 1/32507; H04N 1/00244; H04N 1/0048; H04N 1/32614; H04N 2201/0094
See application file for complete search history.

(56) References Cited

U.S. PATENT DOCUMENTS

| | | | |
|---|---|---|---|
| 2006/0077901 A1* | 4/2006 | Torrey ................... | H04L 43/50 370/242 |
| 2016/0112286 A1* | 4/2016 | Theogaraj .......... | H04L 12/4641 709/224 |

FOREIGN PATENT DOCUMENTS

JP  2011-82599 A  4/2011

* cited by examiner

*Primary Examiner* — Padma Mundur
(74) *Attorney, Agent, or Firm* — Canon U.S.A., Inc. IP Division (57) ABSTRACT

A communication apparatus includes a notification device that notifies information, a first LAN interface that connects to a network, a second LAN interface that connects to a network, transmits a DHCP discovery packet via a LAN cable when the LAN cable is connected to the first LAN interface, and determines whether to provide a notification and to notify information based on a determination to provide a notification based on a DHCP offer packet transmitted in response to the DHCP discovery packet and network information used to communicate via the second LAN interface.

15 Claims, 4 Drawing Sheets

COMMUNICATION APPARATUS PROVIDED WITH LAN INTERFACES AND PREVENTING CONNECTION TO WRONG NETWORK, CONTROL METHOD, AND STORAGE MEDIUM

BACKGROUND

Field

The present disclosure relates to a communication apparatus that detects erroneous insertion of a LAN cable, and a storage medium storing a program therefor.

Description of the Related Art

It has been conventionally known that communication apparatuses such as multifunctional printer (MFP) can connect to a plurality of local area networks (LAN) (Japanese Patent Laid-Open No. 2011-82599).

Devices connected to a LAN have different Internet protocol (IP) addresses, and the LAN uses an IP protocol that designates the IP address of a communication party and transmitting data thereto.

Some apparatuses including a plurality of LAN ports (LAN interfaces) provide different services per LAN port. In the MFP described in Japanese Patent Laid-Open No. 2011-82599, one LAN port is directed for receiving a print job, and the other LAN port is directed for enabling communication for remote use by an external apparatus such as remote operation of a user interface (UI) or remote viewing of image data.

When such an apparatus is used, there can arise a situation in which a LAN cable is temporarily removed and then reconnected. For example, when an apparatus is changed in its installation position, a LAN cable is removed before the apparatus is moved, and the LAN cable is reconnected after the apparatus is moved. In an apparatus having a plurality of LAN ports such as the apparatus in Japanese Patent Laid-Open No. 2011-82599, a wrong LAN cable may be connected to a wrong LAN port when a LAN cable is reinserted into a LAN port. Normal communication can be hindered due to such erroneous connection. For example, it is assumed that there is an apparatus including a first LAN port receiving a print job and a second LAN port not receiving a print job. If a LAN cable connected to a network for transmitting a print job is inserted into the second LAN port in the apparatus, the apparatus cannot receive the print job to be transmitted. Thus, the user, who cannot use the service due to erroneous insertion of the LAN cable, may not understand why the desired service is unavailable.

SUMMARY

Aspects of the present disclosure provides a communication apparatus including a plurality of LAN interfaces that can detect that an incorrect LAN cable is connected to an incorrect LAN port.

An aspect of the present disclosure provides a communication apparatus that includes a notification device that notifies information, a first LAN interface that connects to a network, a second LAN interface that connects to a network, a memory storing at least one program, and at least one controller that when executing the at least one program causes the communication apparatus to transmit a DHCP discovery packet via a LAN cable when the LAN cable is connected to the first LAN interface and to determine whether to provide a notification and to notify information based on a determination to provide a notification based on a DHCP offer packet transmitted in response to the DHCP discovery packet and network information used to communicate via the second LAN interface.

Further features will become apparent from the following description of exemplary embodiments with reference to the attached drawings.

DESCRIPTION OF THE EMBODIMENTS

An embodiment for carrying out the present disclosure will be described below with reference to the drawings. However, the components described in the embodiment are merely exemplary, and do not intend to limit the scope of the disclosure to only the illustrated components.

Figure 1:
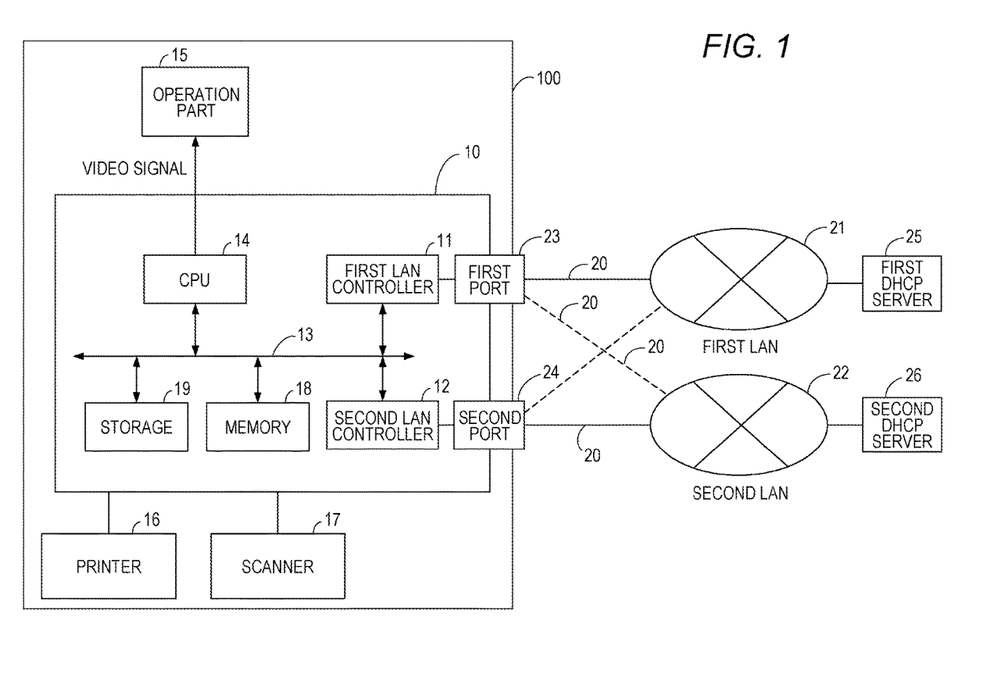
FIG. 1 is a diagram illustrating a communication system configuration.

FIG. 1 is a diagram illustrating a communication system configuration.

An image forming apparatus 100 of FIG. 1 has a control part 10, an operation part 15, a printer 16, and a scanner 17. The control part 10 has a CPU 14, a first LAN controller 11, a second LAN controller 12, a memory 18 for temporary storage, and a storage 19 for nonvolatile memory. The components are connected via an internal bus 13. The image forming apparatus 100 includes the control part 10 and the operation part 15, and functions as a communication apparatus.

The CPU 14 controls communication with a LAN-connected external device, an image processing on an input image, and the user-operated operation part 15, and controls a print processing in the printer 16, a scan processing in the scanner 17, and the like. The operation part 15 includes a screen as a display part and a touch panel. The operation part 15 displays image data generated by the CPU 14 and transmits data on user-touched coordinates to the CPU 14.

The storage 19 is a storage unit that stores programs operating in the CPU 14 or scanned image data. A device such as LAN-connected PC can access the image data stored in the storage 19.

The first LAN controller 11 and the second LAN controller 12, which enable communication with an external device, are connected to a first LAN 21 and a second LAN 22 via LAN cables 20, respectively. The first LAN 21 and the second LAN 22 are different LANs, and in an office, for example, one is an Intranet connection used inside the office while the other is an Internet connection used to connect outside of the office.

An external device, such as PC or smartphone, is connected to a LAN and can access the image forming apparatus 100. The two LANs are generally set with different user authorities, respectively, in terms of security. Since Intranet is a network usable by only limited user, many services (all services) can be provided to the users that can connect to the network. Since Internet is a network used by an unspecified number of users, the users connecting to the network can be provided with only some (part of) services. The user authorities usable in the respective LANs are defined, for example, as illustrated in Table 1.

TABLE 1

|  | First LAN controller 11 | Second LAN controller 12 |
| --- | --- | --- |
| Connection destination | First LAN 21 (Intranet) | Second LAN 22 (Internet) |
| Operations permitted in image forming apparatus 100 | Printing, and access to storage Setting change by manager | Printing |
| Operations prohibited in image forming apparatus 100 | None | Access to storage Setting change by manager |

The first LAN controller 11 and the second LAN controller 12 have a first port 23 and a second port 24, respectively, and the first port 23 and the second port 24 can be connected to the first LAN 21 and the second LAN 22 via the LAN cables 20, respectively. The first port 23 and the second port 24 have the same shape. It is assumed that the communication standards of the first LAN 21 and the second LAN 22 conform to Ethernet®, for example, and the protocols thereof use TCP/IP. When connecting with the LAN cables 20, the LAN controllers 11 and 12 acquire the IP addresses from a dynamic host configuration protocol (DHCP) server according to DHCP.

A first DHCP server 25 is connected to the first LAN 21, and provides the first LAN controller 11 with a first IP address. A second DHCP server 26 is connected to the second LAN 22, and provides the second LAN controller 12 with a second IP address. The IP addresses used by the first LAN controller 11 and the second LAN controller 12 are mutually different in their subnets, and thus the image forming apparatus 100 can discriminate the accesses from the two LANs by the subnets. A subnet is a higher part of an IP address, and has to be set at a common value among LAN-connected devices. A lower part of the IP address is set at a unique value per device, and communication is thereby enabled within the LAN.

The two ports 23 and 24 have the same shape as described above, and thus the user can erroneously insert a LAN cable 20 into a different LAN port from the correct LAN port as illustrated in a dotted line in FIG. 1. That is, the first LAN controller 11 is connected to the second LAN 22 via the first port 23, or the second LAN controller 12 is connected to the first LAN 21 via the second port 24. In the state, there arises a security problem that an unintended LAN device can access the image forming apparatus 100.

[Embodiment]

A method for determining whether an IP address of a LAN controller is appropriately set according to an exemplary embodiment will be described below.

According to the present embodiment, there will be described by way of example how to determine whether an IP address to be set is appropriate using the IP address set for the second LAN controller 12 before the IP address of the first LAN controller 11 is set.

Figure 2:
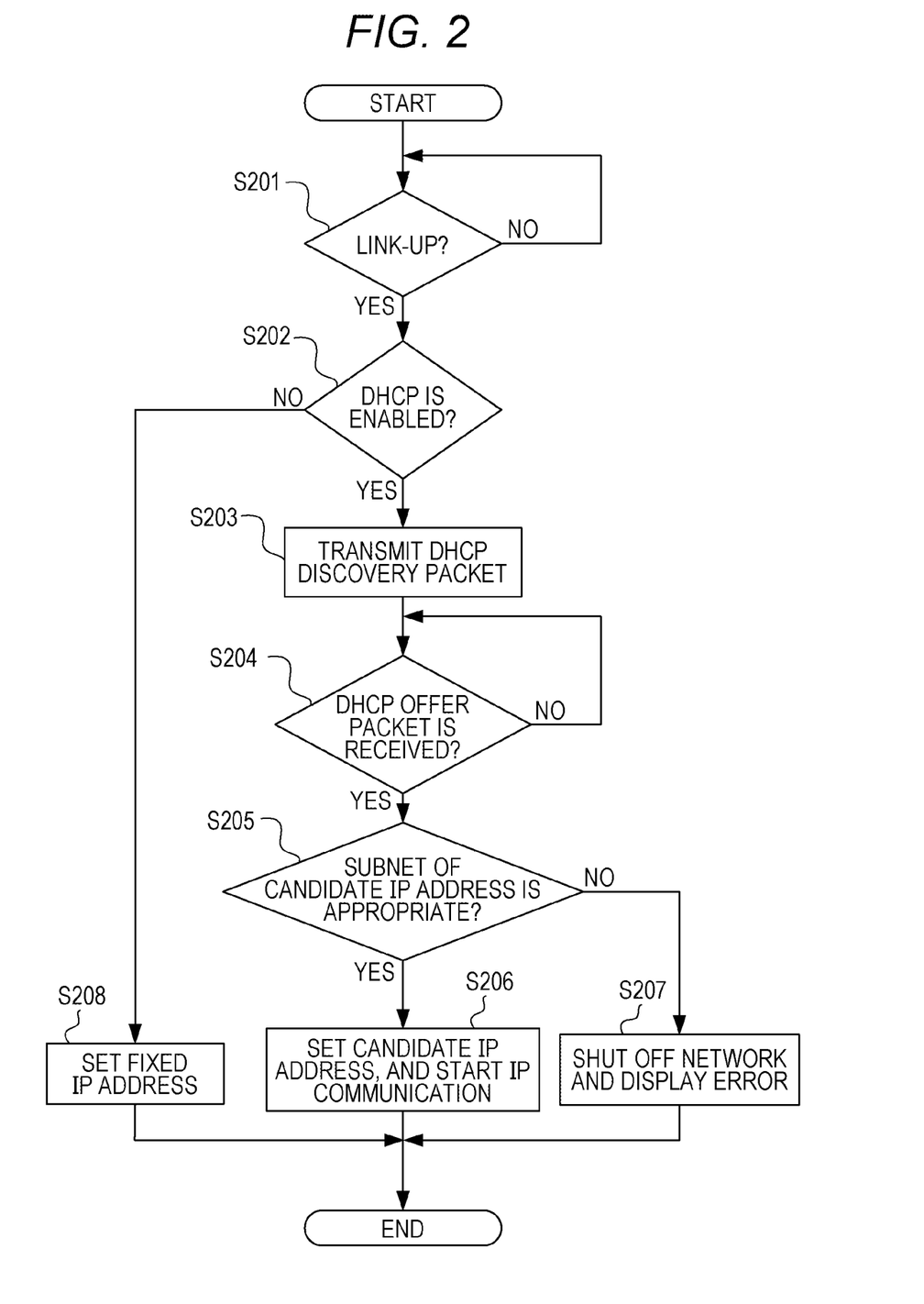
FIG. 2 is a diagram illustrating a flowchart of an IP address setting processing.

FIG. 2 is a flowchart illustrating an IP address setting processing by the CPU 14 when setting the IP address of the first LAN controller 11 according to the present embodiment.

The programs operating in the image forming apparatus 100 executing the processing associated with the flowchart are stored in the storage 19 as nonvolatile memory of FIG. 1, for example, and are read into the memory 18 and executed by the CPU 14. This is similarly applicable to the flowchart of FIG. 5 described below. A symbol S indicates step in the following description(s).

The processing associated with the flowchart of FIG. 2 initially waits for the LAN cable 20 to be connected to the first port 23.

When the LAN cable 20 is connected to the first port 23, the CPU 14 determines in S201 whether the first LAN controller 11 enters the link-up state. If it is determined that the link-up state has been entered, the processing proceeds to S202. The link-up state indicates that the first LAN controller 11 is electrically connected to an external apparatus via the LAN cable 20. According to the present embodiment, one end of the LAN cable 20 is connected to the first port 23 while the other end of the LAN cable 20 is connected to a device such as hub or bridge belonging to the first LAN 21 or the second LAN 22.

Immediately after the link-up state, an IP address is not set yet for the first LAN controller 11. Thus, the first LAN controller 11 cannot make IP communication. Therefore, even if the first port 23 and the second LAN 22 are connected via the LAN cable 20, the device belonging to the second LAN 22 cannot access the image forming apparatus 100, and cannot use the services of the image forming apparatus 100.

In S202, the CPU 14 determines whether DHCP is enabled as a method for setting an IP address of the first LAN controller 11. The setting is previously saved in the storage 19. When DHCP is disabled (S202: NO), the processing proceeds to S208 where a fixed value is set and used as an IP address, and thus an IP address previously saved in the storage 19 is set for the first LAN controller 11. The processing ends.

Advantages and disadvantages of using the DHCP function will be described herein.

When a fixed IP address is set for the first LAN controller 11, if the subnet part of the set IP address does not match with the subnet of the first LAN 21, communication cannot be made. Therefore, even if the second LAN 22 and the first LAN controller 11 are connected due to erroneous insertion of the LAN cable 20, communication cannot be started. Thus, it is advantageous that the method using a fixed IP address has a low security risk. In the method using a fixed IP address, however, even an inactive device consumes one IP address. Thus, in an environment, such as large-scale office, in which more devices than the IP addresses capable of being present in the same subnet are used, the IP addresses are lacking, and a device which cannot be assigned with an IP address can be caused.

In order to solve the shortage of IP addresses, an IP address only has to be assigned to only an active device. Therefore, in DHCP, an IP address is issued from a DHCP server each time a device is connected to a LAN. It is time-consuming to manually set or manage an IP address per device. Thus, DHCP is used in many cases even in a small-scale LAN environment. Thus, according to the present embodiment, a method that reduces security risks due to erroneous insertion of a LAN cable while using DHCP will be discussed.

When it is determined that DHCP is enabled in S202 (S202: YES), in S203, the CPU 14 transmits a DHCP discovery packet using the first LAN controller 11. The packet is transmitted to an unspecified number of devices on the network. The DHCP server (the DHCP server 25 or 26) that receives the DHCP discovery packet issues and transmits a DHCP offer packet to the first LAN controller 11 as a transmission source. The DHCP offer packet includes information on a candidate IP address. The candidate IP address is selected from the unused IP addresses in the network to which the DHCP server belongs. An unused IP address is selected as a candidate in the LAN 21 for the DHCP server 25. An unused IP address is selected as a candidate in the LAN 22 for the DHCP server 26.

In S204, the CPU 14 waits until the first LAN controller 11 receives the DHCP offer packet (S204: NO). When the first LAN controller 11 receives the DHCP offer packet (S204: YES), the CPU 14 extracts the subnet from the candidate IP address included in the received DHCP offer packet in S205. The CPU 14 then determines whether the candidate IP address included in the DHCP offer packet is appropriate based on determination information with the extracted subnet as criteria for determining.

According to the present embodiment, the subnet part of the IP address currently set for the second LAN controller 12 other than the first LAN controller 11 is used as the determination information. The determination information can be the subnet part of an IP address previously set for the second LAN controller 12. Both a currently-set IP address and a previously-set IP address can be used as the determination information. The previously-set IP addresses can be saved and accumulated as history information in the storage 19.

In S205, when the subnet of the candidate IP address is determined as inappropriate (S205: NO), the processing proceeds to S207. According to the present embodiment, when the subnet of the determination information matches with the subnet of the candidate IP address, the CPU 14 determines the subnet of the candidate IP address as inappropriate. This is because when the subnet of the candidate IP address for the first LAN controller 11 matches with the subnet of the IP address set for the second LAN controller 12, the first LAN controller 11 is likely to be connected to the second LAN 22.

In S207, the CPU 14 generates error screen data and transmits it to the operation part 15, causing the operation part 15 to display an error message as an error screen. Thereafter, the CPU 14 terminates the processing without setting an IP address for the first LAN controller 11.

In S205, when the subnet of the candidate IP address is determined as appropriate (S205: YES), the processing proceeds to S206. According to the present embodiment, when the subnet of the determination information does not match with the subnet of the candidate IP address, the CPU 14 determines the subnet of the candidate IP address as appropriate. According to the present embodiment, when the subnet of the candidate IP address for the first LAN controller 11 does not match with the subnet of the IP address set for the second LAN controller 12, the processing proceeds to S206.

In S206, the CPU 14 determines an IP address set for the first LAN controller 11 from the acquired candidate IP addresses, starts IP communication, and then terminates the processing.

Figure 3:
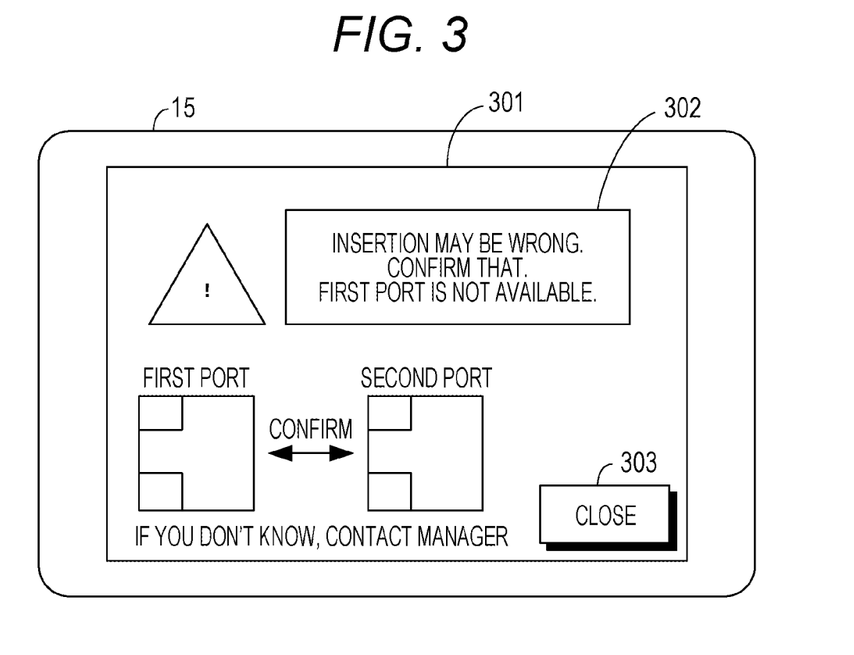
FIG. 3 is a diagram illustrating an error screen when erroneous insertion of a LAN cable is detected.

FIG. 3 illustrates an exemplary error screen displayed on a display screen of the operation part 15 in S207 when the subnet of the candidate IP address is determined as inappropriate in S205.

A display screen 301 of the operation part 15 is a display (display part) that displays image data. A transparent touch panel is provided on the display screen 301, and the user touches and selects a button displayed on the screen thereby to operate the image forming apparatus 100. In S207, an error message 302 and the like are displayed on the display screen 301. Thus, a possibility of erroneous insertion is notified to the user. Herein, a possibility that the LAN cable 20 is erroneously inserted into the first port 23, and unavailability of communication using the first port 23 (the first LAN controller 11) are notified.

When the user presses a close button 303 in response to the error message 302, the error screen ends and transitions to the normal screen.

Figure 4:
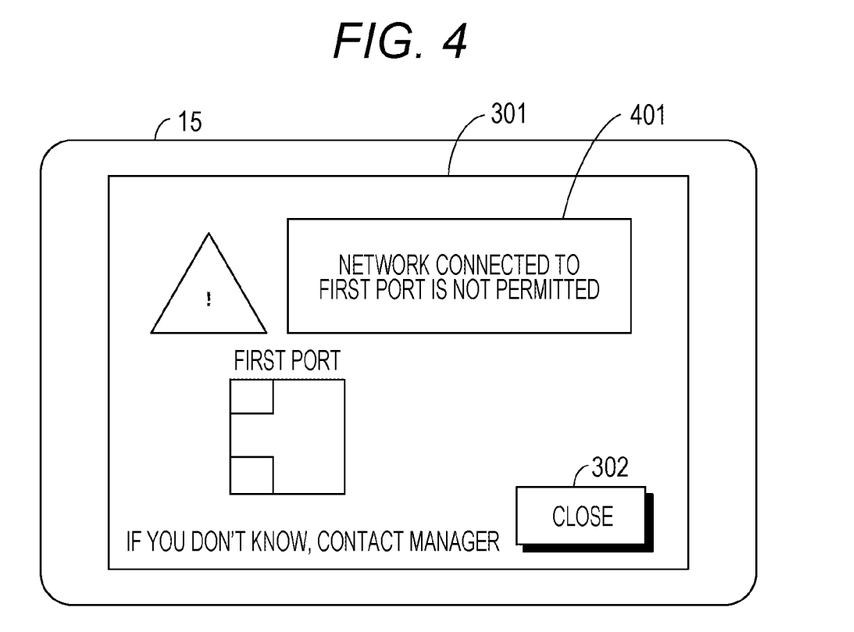
FIG. 4 is a diagram illustrating an error screen when determination information is not present.

The error screen displayed in S205 is not limited to just the screen illustrated in FIG. 3. FIG. 4 is a diagram illustrating an error screen when the determination information is not present.

The error screen illustrated in FIG. 4 is displayed on the display screen 301 when the determination information cannot be acquired in S205. The case in which the determination information cannot be acquired can be a case in which an IP address is not set for the second LAN controller 12, or a case in which the history information is not stored in the storage 19. This can occur, for example, when an IP address has never been set for the second LAN controller 12. In this case, it is not possible to determine whether an IP address set for the first LAN controller 11 is appropriate. Therefore, the CPU 14 causes the operation part 15 to display an error to notify the error to the user. The CPU 14 does not set an IP address for the first LAN controller 11 to disable communication in the first LAN controller 11.

The error message displayed on the display screen 301 in FIG. 4 is not due to erroneous insertion of the LAN cable, but due to the absence of the determination information. Thus, the error message displayed in FIG. 4 just has to indicate unavailability of the first port 23 (the first LAN controller 11) unlike the error message of FIG. 3. A message indicating that the network connected to the first port 23 is not permitted can be displayed like an error message 401 of FIG. 4.

Figure 5:
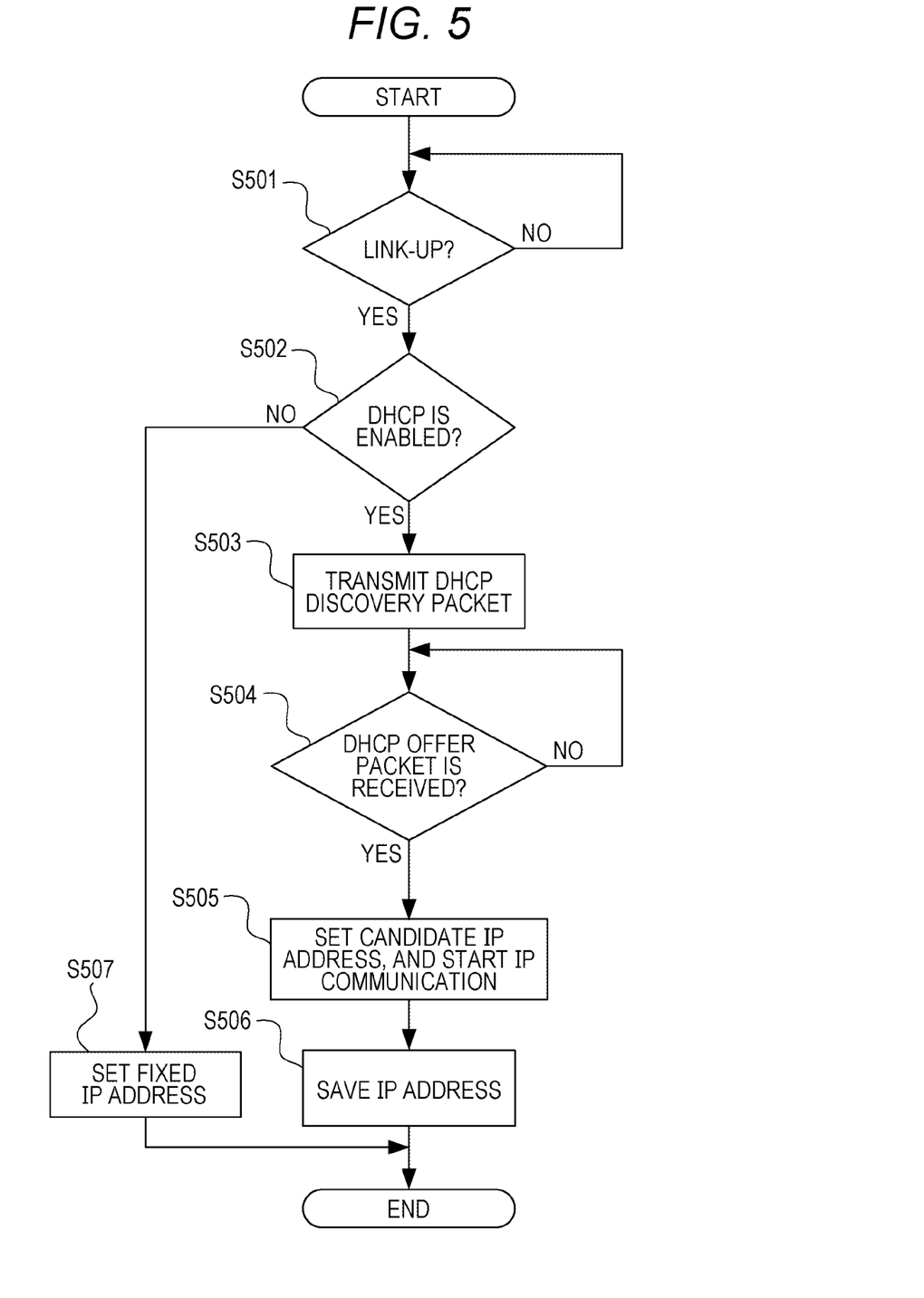
FIG. 5 is a diagram illustrating a flowchart of an IP address saving processing.

FIG. 5 is a diagram illustrating a flowchart of an IP address saving processing. A case in which an IP address is saved in the storage 19 when the IP address is set for the second LAN controller 12 will be illustrated herein. The IP address information saved in the storage 19 is used as the determination information in S205 as described above. In other words, when the LAN cable 20 is connected to the first port 23, the CPU 14 determines whether a candidate IP address acquired from the DHCP server is appropriate for the IP address of the first LAN controller 11 based on the IP address information saved in the storage 19.

The processing associated with the flowchart of FIG. 5 initially waits for the LAN cable 20 to be connected to the second port 24.

When the LAN cable 20 is connected to the second port 24 of the second LAN controller 12, the CPU 14 determines whether the second LAN controller 12 enters the link-up state in S501, and waits until the second LAN controller 12 enters the link-up state (S501: NO). When the second LAN controller 12 enters the link-up state (S501: YES), the processing proceeds to S502. In S502, the CPU 14 determines whether DHCP is enabled as a method for setting an IP address of the second LAN controller 12. The setting is previously saved in the storage 19. When DHCP is disabled (S502: NO), in S507, a fixed value is set and used for an IP address, and thus an IP address previously saved in the storage 19 is set for the second LAN controller 12. The processing then ends.

When DHCP is enabled (S502: YES), the CPU 14 transmits a DHCP discovery packet from the second LAN controller 12 in S503. In S504, the CPU 14 waits until the second LAN controller 12 receives a DHCP offer packet (S504: NO). When the second LAN controller 12 receives the DHCP offer packet, the CPU 14 sets a candidate IP address included in the received DHCP offer packet as an IP address of the second LAN controller 12 in S505. The CPU 14 then starts IP communication by use of the set IP address. Subsequently, the CPU 14 saves the IP address used for the setting in the storage 19 in S506, and terminates the processing. The IP address saved at this time is used as determination information when setting an IP address of the first LAN controller 11.

In the above-described processings, when the subnet of an IP address to be set for the first LAN controller 11 matches with the subnet of the second LAN 22, the IP address is not set for the first LAN controller 11. Thus, the first LAN controller 11 cannot be used. Therefore, even if the first LAN controller 11 and the second LAN 22 are connected due to user's erroneous insertion of the LAN cable 20, communication with a security problem is not started.

[Variant]

The above-described embodiment included the example in which when the LAN cable 20 is connected to the first LAN controller 11 to acquire a candidate IP address, a determination is made whether the candidate IP address is appropriate using the information on the IP address set for the second LAN controller 12. However, the present disclosure is accomplished even when the relationship is reversed. That is, when the LAN cable 20 is connected to the second LAN controller 12 to acquire a candidate IP address, a determination can be made whether the candidate IP address is appropriate using the information on the IP address set for the first LAN controller 11 as the determination information.

The above-described embodiment included the example in which LAN controllers include two ports, respectively, but can be applied to a configuration with three or more ports. In this case, the subnets of the IP addresses set for all the LAN controllers except the LAN controller connected with the LAN cable 20 can be extracted. Whether the subnet of a candidate IP address matches with any of the extracted subnets is determined. If any subnet matches, the candidate IP address can be determined as inappropriate.

The history information can be used for the configuration with three or more LAN controllers each having a port. That is, the subnets of the IP addresses previously set for all the LAN controllers except the LAN controller connected with the LAN cable 20 can be extracted. A plurality of items of IP address information as history information can be present for one LAN port. In this case, whether the candidate IP address matches with any IP address information is determined, and if it matches with any IP address information, the candidate IP address can be determined as inappropriate.

The above-described embodiment included the example in which the determination information for a candidate IP address of a LAN controller is acquired from IP address information on the other LAN controller. The history information of the IP addresses previously set for the LAN controller to be set with a candidate IP address can be assumed as determination information. In this case, if the candidate IP address of the LAN controller matches any IP address information in the history information, it can be determined as appropriate.

The above-described embodiment included the configuration in which the CPU 14 controls the two LAN controllers 11 and 12. However, this configuration is not limiting, and another applicable configuration can include two CPUs that control the two LAN controllers 11 and 12, respectively.

As described above, the communication apparatus according to the present disclosure includes a plurality of LAN controllers (11, 12) that connect to different LANs (21, 22), respectively. The communication apparatus has a candidate IP address acquisition unit (14, S202 to S204), a determination unit (14, S205), and a control unit (14, S206, S207). The candidate IP address acquisition unit acquires a candidate IP address to be set when an address by which a LAN controller can access a LAN-connected device is set for the LAN controller (S202 to S204). The determination unit determines whether the candidate IP address acquired by the candidate IP address acquisition unit is appropriate (S205). The control unit does not set an IP address for the LAN controller to disable the LAN controller when the determination unit determines the candidate IP address acquired by the candidate IP address acquisition unit as inappropriate (S207). The control unit sets an acquired IP address for the LAN controller and enables the LAN controller when the determination unit determines the candidate IP address acquired by the candidate IP address acquisition unit as appropriate (S206).

A communication apparatus configured according to the present disclosure provides the following advantages. When LAN cables are inserted into a plurality of LAN controllers (a plurality of ports) that can be connected to different LANs, respectively, erroneous insertion of a LAN cable can be detected before IP addresses are assigned to the LAN controllers. When erroneous insertion of a LAN cable into a LAN controller is detected, the communication apparatus according to the present disclosure does not set an IP address for the LAN controller, and disables the LAN controller. This enables reducing a state in which an unintended service is provided or an occurrence of a communication environment with a security risk due to erroneous insertion of a LAN cable.

The present disclosure is applicable to image forming apparatuses in other systems, digital combined machines, and the like as long as it is configured to realize the similar functions to the above image forming apparatus.

The present disclosure is applicable to communication apparatuses, information processing apparatuses having a communication function, terminals, and the like, not limited to image forming apparatuses.

(Other Example)

The present disclosure can be realized by supplying a system or an apparatus with programs for realizing one or more functions of the above-described embodiment(s) via a network or a storage medium, and reading and executing the programs by one or more processors in the computer in the system or apparatus. The present disclosure can be realized by a circuit (such as ASIC) configured to realize one or more functions of the above-described embodiment(s).

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-000549, filed Jan. 5, 2018, which is hereby incorporated by reference herein in its entirety.

What is claimed is:

1. A communication apparatus comprising:
   a notification device that notifies information;
   a first LAN interface that connects to a LAN cable;
   a second LAN interface that connects to the LAN cable;
   a memory storing at least one program; and
   at least one controller that when executing the at least one program causes the communication apparatus to:
   transmit a DHCP discovery packet via the first LAN interface in response to detecting a link-up indicating the first LAN interface is connected to an external device via the LAN cable and the first LAN interface is set to use a first network using a first IP address;
   acquire a candidate IP address included in a DHCP offer packet transmitted in response to the DHCP discovery packet;
   check a matching between at least a part of the candidate IP address and at least a part of a second IP address associated with a second network accessible to the external device, the second IP address being currently set or previously set;
   set the first IP address from the candidate IP address according to a first result of the matching; and
   provide a notification via the notification device according to a second result of the matching.

2. The communication apparatus according to claim 1, wherein the notification device is a display device configured to display information and the display device displays the notification.

3. The communication apparatus according to claim 1, wherein when the part of the third candidate IP address matches the part of the second IP address, it is determined to provide the notification via the notification device.

4. The communication apparatus according to claim 2, wherein the notification prompts a user to confirm an insertion state of the LAN cable.

5. The communication apparatus according to claim 2, wherein the notification information indicates that communication using the first LAN interface is not available.

6. The communication apparatus according to claim 1, Wherein, when the part of the candidate IP address matches the part of the second IP address, it is determined not to make communication via the first LAN interface with the candidate IP address.

7. The communication apparatus according to claim 1, wherein a DHCP discovery packet is transmitted via a LAN cable when the LAN cable is connected to the first LAN interface.

8. The communication apparatus according to claim 1, wherein the second IP address is one IP address from among a plurality of IP addresses previously set for the second LAN interface.

9. A method for controlling a communication apparatus including a notification device that notifies information, a first LAN interface that connects a LAN cable, and a second LAN interface that connects the LAN cable, the method comprising:
   transmitting a DHCP discovery packet via the first LAN interface in response to detecting a link-up indicating the first LAN interface is connected to an external device via the LAN cable and the first LAN interface is set to use a first network using a first IP address;
   acquiring a candidate IP address included in a DHCP offer packet transmitted in response to the DHCP discovery packet;
   checking a matching between at least a part of the candidate IP address and at least a part of a second IP address associated with a second network accessible to the external device, the second IP address being currently set or previously set;
   setting the first IP address from the candidate address according to a first result of the matching; and
   providing a notification the notification device according to a second result of the matching.

10. A non-transitory computer-readable storage medium storing a program for causing a computer to perform a method for controlling a communication apparatus including a notification device that notifies information, a first LAN interface that connects a LAN cable, and a second LAN interface that connects the LAN cable, the method comprising:
    transmitting a DHCP discovery packet via the first LAN interface in response to detecting a link-up indicating the first LAN interface is connected to an external device via the LAN cable and the first LAN interface is set to use a first network using a first IP address;
    acquiring a candidate IP address included in a DHCP offer packet transmitted in response to the DHCP discovery packet;
    checking a matching between at least a part of the candidate IP address and at least a part of a second IP address associated with a second network accessible to the external device, the second IP address being currently set or previously set;
    setting the first IP address from the candidate address according to a first result of the matching; and
    providing a notification via the notification device according to a second result of the matching.

11. A communication apparatus comprising:
    a first LAN interface that connects a LAN cable;
    a second LAN interface that connects the LAN cable;
    at least one memory storing at least one program; and
    at least one controller that when executing the at least one program causes the communication apparatus to:
    transmit a DHCP discovery packet via the first LAN interface in response to detecting a link-up of indicating the first LAN interface is connected to an external device via the LAN cable and the first LAN interface is set to use a first network using a first IP address;
    acquire a candidate IP address included in a DHCP offer packet transmitted in response to the DHCP discovery packet;
    check a matching between at least a part of the candidate IP address and at least a part of a second IP address associated with a second network accessible to the external device, the second IP address being currently set or previously set;

set the first IP address from the candidate address according to a first result of the matching; and communicate via the first LAN interface using the candidate IP address according to a second result of the matching.

12. The communication apparatus according to claim 11, wherein, when the part of the candidate IP address matches the part of the second IP address, it is determined to communicate via the first LAN interface.

13. The communication apparatus according to claim 11, wherein the second IP address is one IP address from among a plurality of IP addresses previously set for the second LAN interface.

14. The communication apparatus according to claim 1, wherein the part of the candidate IP address is a network part of the candidate IP address, and wherein the part of the second IP address is a network part of the second IP address.

15. The communication apparatus according to claim 11, wherein the part of the candidate IP address is a network part of the candidate IP address, and wherein the part of the second IP address is a network part of the second IP address.

* * * * *